United States Patent
Le et al.

(10) Patent No.: US 7,269,715 B2
(45) Date of Patent: Sep. 11, 2007

(54) INSTRUCTION GROUPING HISTORY ON FETCH-SIDE DISPATCH GROUP FORMATION

(75) Inventors: Hung Qui Le, Austin, TX (US); David Stephen Levitan, Austin, TX (US); John Wesley Ward, III, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 11/050,344

(22) Filed: Feb. 3, 2005

(65) Prior Publication Data

US 2006/0174091 A1  Aug. 3, 2006

(51) Int. Cl.
 *G06F 9/38* (2006.01)
(52) U.S. Cl. ..................................... 712/215
(58) Field of Classification Search ................ 712/215
 See application file for complete search history.

(56) References Cited

U.S. PATENT DOCUMENTS

| | | | |
|---|---|---|---|
| 5,337,415 A | | 8/1994 | DeLano et al. |
| 5,446,850 A | * | 8/1995 | Jeremiah et al. ............ 712/215 |
| 5,459,844 A | | 10/1995 | Eickemeyer et al. |
| 5,509,130 A | | 4/1996 | Trauben et al. |
| 5,812,811 A | * | 9/1998 | Dubey et al. ................ 712/216 |
| 5,828,895 A | * | 10/1998 | Chan et al. .................... 712/23 |
| 6,047,368 A | * | 4/2000 | Arya .......................... 712/215 |
| 6,237,077 B1 | | 5/2001 | Sharangpani et al. |
| 6,460,132 B1 | | 10/2002 | Miller |
| 6,654,869 B1 | | 11/2003 | Kahle et al. |
| 2002/0087830 A1 | | 7/2002 | Faraboschi et al. |
| 2002/0116567 A1 | | 8/2002 | Vondran |

OTHER PUBLICATIONS

Konigsburg et al., Fetch-Side Instruction Dispatch Group Formation.

* cited by examiner

*Primary Examiner*—William M. Treat
(74) *Attorney, Agent, or Firm*—Duke W. Yee; Diana R. Gerhardt; Wayne P. Bailey

(57) ABSTRACT

An improved method, apparatus, and computer instructions for grouping instructions processed in equal sized sets. A current set of instructions is received in an instruction cache for dispatching. A determination is made as to whether any instructions in the current set of instructions are part of a group including a prior set of instructions received in the instruction cache including using a history data structure, wherein the history data structure contains data regarding instructions in the prior set of instructions. Any instructions are grouped into the group with the instruction in response to a determination that the any instructions are part of the group. Instructions in the group units are dispatched to execution using the history data structure, wherein invalid instruction dispatch groupings are avoided.

14 Claims, 6 Drawing Sheets

INSTRUCTION GROUPING HISTORY ON FETCH-SIDE DISPATCH GROUP FORMATION

CROSS REFERENCE TO RELATED APPLICATION

The present invention is related to an application entitled "Fetch-Side Instruction Dispatch Group Formation", U.S. patent application Ser. No. 11/050,367, filed even date hereof, assigned to the same assignee, and incorporated herein by reference.

BACKGROUND OF THE INVENTION

1. Technical Field

The present invention relates generally to an improved data processing system and in particular, the present invention relates to a method and apparatus for processing instructions. Still more particularly, the present invention relates to a method, apparatus, and computer processor design methodology for grouping instructions for execution.

2. Description of Related Art

A processor is the component in a data processing system that is used to execute instructions. Fundamentally, processors take signals in form of logic zeros and logic ones and manipulate these signals according to a set of instructions to produce an output in the form of logic zeros and ones. A processor contains various functional components. In particular, the processor contains execution units used to execute instructions. Additionally, a processor may include a branch predictor. This type of unit is used to guess the sequence in which instructions will be executed each time a program contains a conditional jump. This prediction is performed such that a pre-fetch or decode unit may obtain instructions in advance. Other types of units within a processor include, for example, a floating point unit, which performs non-integer type relations.

A processor also contains a level one cache, which is the cache closest to the processor. A level one cache is typically located within the processor core and may be implemented as a unified cache or separate sections for instruction and data. This L1 cache also is referred to as a primary or internal cache.

In executing instructions, currently available high-performance processor designs group instructions such that the instructions can be executed more efficiently. These grouped instructions are dispatched into queues for execution as a group. Instructions within a dispatch group will dispatch together and complete together.

Although this type of grouping provides for higher performance and more efficient instruction tracking, a critical path or bottleneck has been recognized by the present invention. When an incoming stream of instructions needs to be broken apart into special dispatch groups, these groups or formations allow the dispatch unit to send instructions to the execution units on a per-group basis. This logic is performed on-the-fly as the instructions are fetched from an instruction cache by an instruction fetch unit. The function for creating formations of groups take time. This type of dispatching adds pipeline delays to the processing of every instruction in these types of processor architectures.

Therefore, it would be advantageous to have an improved method, apparatus, and computer instructions for processing and grouping instructions.

SUMMARY OF THE INVENTION

The present invention provides an improved method, apparatus, and computer instructions for grouping instructions processed in equal sized sets. A current set of instructions is received in an instruction cache for dispatching. A determination is made as to whether any instructions in the current set of instructions are part of a group including a prior set of instructions received in the instruction cache including using a history data structure, wherein the history data structure contains data regarding instructions in the prior set of instructions. Any instructions are grouped into the group with the instruction in response to a determination that the any instructions are part of the group. Instructions in the group units are dispatched to execution using the history data structure, wherein invalid instruction dispatch groupings are avoided.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
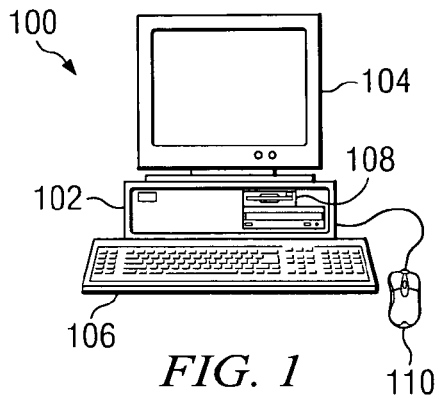
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
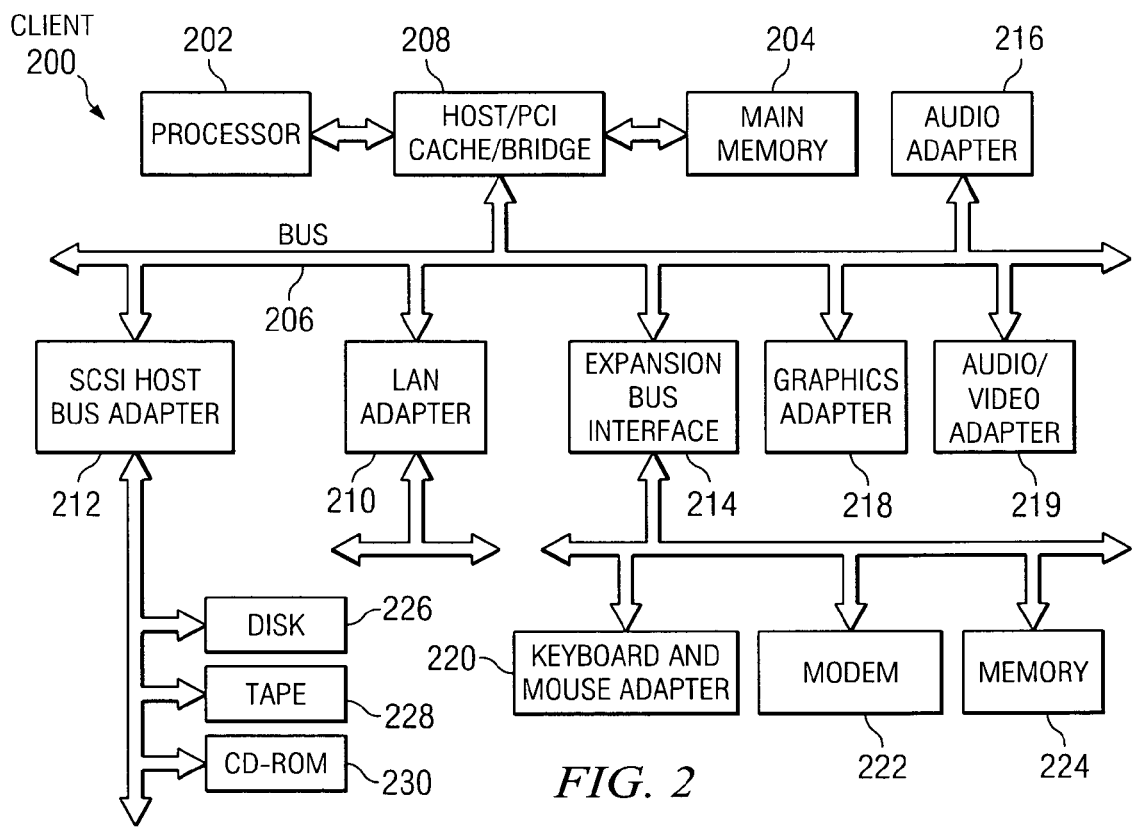
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors.

In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

The present invention provides an improved method, apparatus, and computer instructions for fetch-side instruction dispatch group formation. The present invention includes a mechanism for performing instruction dispatch group formation or grouping before the instructions are written into the instruction cache. As a result, rather than adding pipeline delays to the execution of every instruction as with currently available architectures, the mechanism of the present invention allows the delay associated with the group formation to be performed in a location that causes less degradation of performance.

Additionally, group formations are maintained through using this mechanism of the present invention. By placing the group formation logic before the instruction cache in the processor, the impact of additional cycles that are required for group formation are minimized.

Figure 3:
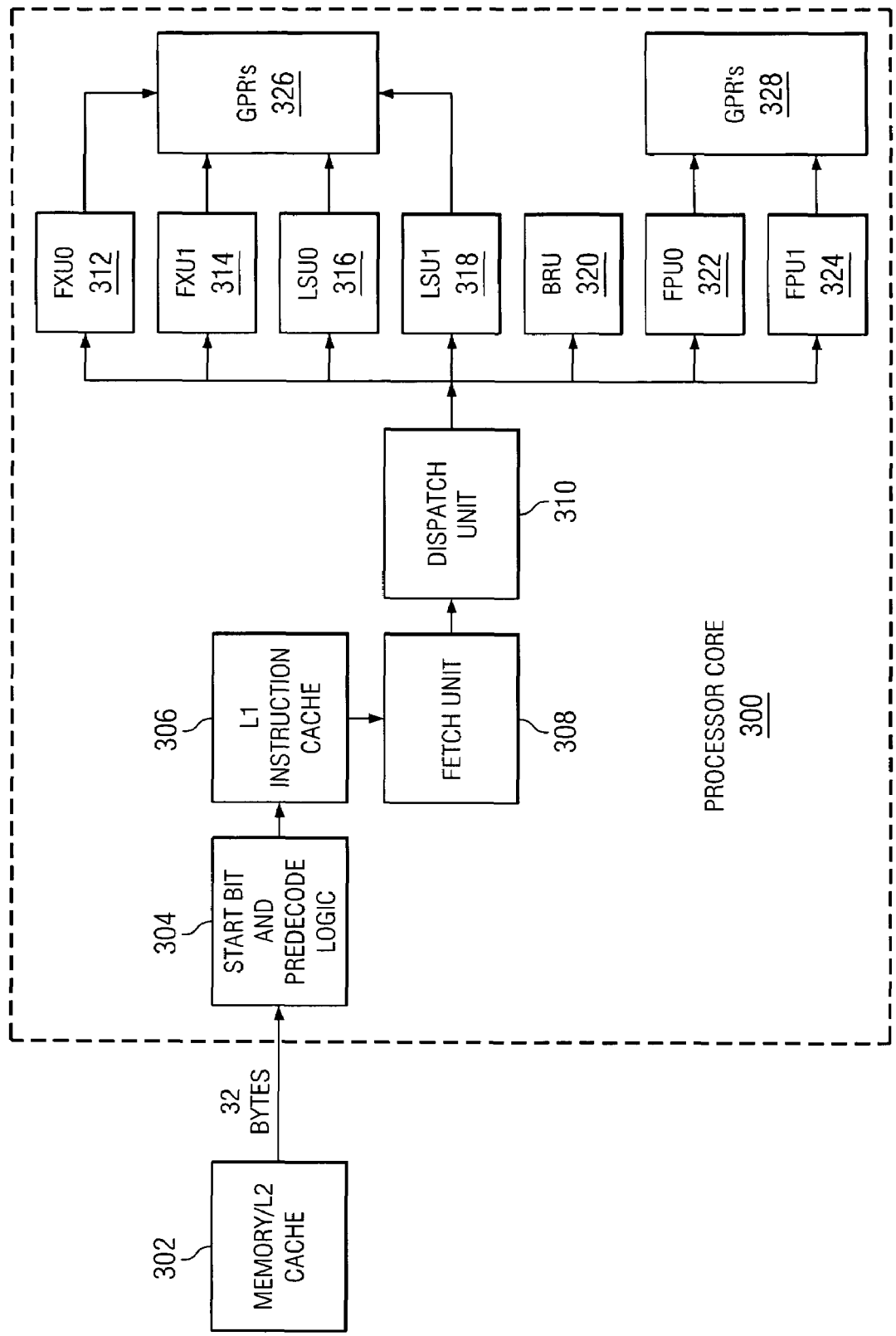
FIG. 3 is a block diagram illustrating components used in providing fetch-side instruction dispatch group formation in accordance with an illustrative embodiment of the present invention.

Turning now to FIG. 3, a block diagram illustrating components used in providing fetch-side instruction dispatch group formation is depicted in accordance with an illustrative embodiment of the present invention. In this example, processor core 300 receives instructions from memory/L2 cache 302. Memory/L2 cache 302 may be, for example, main memory 204 in FIG. 2. These instructions are received across a 32-byte line in these examples. Eight four-byte instructions are received each time data is transferred from memory/L2 cache 302 to processor core 300. The particular number of instructions and the width of the line connecting memory/L2 cache 302 to processor core 300 are specified only for purposes of illustration and not meant to limit the architecture in which the present invention may be implemented. Of course, other size lines and other numbers of instructions may be used depending on the particular implementation.

In this particular example, processor core 300 includes start bit and precode logic 304, L1 instruction cache 306, fetch unit 308, and dispatch unit 310. Processor core 300 also contains multiple execution units. In this illustrative example, these execution units include fixed point unit (FXU0) 312, fixed point unit (FXU1) 314, load/store unit (LSU0) 316, load/store unit (LSU1) 318, branch unit (BRU) 320, floating point unit (FPU0) 322, and floating point unit (FPU1) 324. Processor core 300 also contains general purpose registers (GPRs) 326 and 328. Fixed point unit 312, fixed point unit 314, load/store unit 316, and load/store unit 318 input their source operand information from general purpose registers 326. Floating point unit 322 and floating point unit 324 input their operand information from general purpose registers 328.

In this example, L1 instruction cache 306 contains the instructions that are to be sent to the execution units for processing as well as their start bit information. Fetch unit 308 decides when to retrieve data and instructions from L1 instruction cache 304. Dispatch unit 310 sends the instructions to the different execution units. Dispatch unit 310 may send instructions in groups to the different execution units. In these illustrative examples, the start of a group is defined using a start bit associated with an instruction. Therefore, when an instruction is encountered with a start bit, the beginning of a group is identified. When another instruction with a start bit is encountered, then the beginning of another group is identified.

Floating point units 312 and 314 perform non-integer calculations. Load/store units 316 and 318 are used to load and store data into different memory locations. Branch unit 320 is used to predict the outcome of a branch instructions. Floating units 322 and 324 perform floating point operations.

General purpose registers 326 and 328 are storage areas for data used by the different execution units to complete tasks that have been requested. The data stored in these general purpose registers may come from various sources, such as a data cache, memory unit, or some other unit within the processor core. General purpose registers 326 and 328 provides quick and efficient retrieval of data for the different execution units within processor core 300.

High performance is achieved within processor core 300 through processing multiple instructions simultaneously at various execution units. Accordingly, each instruction is processed as a sequence of stages, with each instruction being executable and parallel with stages of other instructions. This technique is also called "pipelining". In typical execution, an instruction is normally processed using six stages. These stages include fetch, decode, dispatch, execute, completion, and write-back.

The mechanism of the present invention provides for grouping of instructions for dispatch by dispatch unit 310 through start bit and pre-code logic 304. This functional unit is located before L1 instruction cache 306 to provide for efficiency in processing instructions. This grouping of instructions is performed prior to the instructions being placed into L1 instruction cache 306. As a result, the time needed to perform grouping functions does not cause a bottleneck when fetch unit 308 fetches or retrieves instructions from L1 instruction cache 306 for dispatch by dispatch unit 310. Currently available architectures implement the grouping function within or after L1 instruction cache 306.

In these examples, instructions are written into L1 instruction cache 306 one line at a time. Each line is broken into four sectors with each sector containing eight instructions to equal 32 instructions. Start bit and pre-code logic 304 send instructions into L1 instruction cache 306 eight instructions at a time.

The pre-code logic within start bit and pre-code logic 304 receives instructions from memory/L2 cache 302 one sector at a time. The pre-code logic within start bit and pre-code logic 304 then assigns start bits to particular instructions based on the groups formed by this logic. A start bit assigned to an instruction indicates that the instruction needs to be at the beginning of a new dispatch group. This start bit also indicates that the previous instruction was the last instruction of the prior dispatch group.

For example, the first instruction in a sector is considered instruction 0. This instruction automatically receives a start bit. A start bit is used in these illustrative examples because nothing is known about previous instructions without maintaining some sort of history across different sectors. Mechanisms other than a start bit may be used as an indicator for grouping instructions. In these illustrative examples, start bits are the simplest solution and aid in making the dispatch units logic as simple as possible. Complexity could be shifted from start bit logic to the dispatcher. For example, predecode could assign instruction bits to indicate which unit they use and register dependencies. The dispatcher may then use these instruction bits to perform group formation. The next instruction, instruction1, may then be assigned a start bit based on various reasons. These reasons may involve instruction1 itself. For example, downstream logic requires that the instruction may be first in a dispatch group. Alternatively, limitations of the dispatch group size may require assigning instruction one a start bit. For example, a maximum dispatch group size of five instructions means that at a minimum every fifth instruction must have a start bit. Further, instruction 1 also may be assigned a start bit based on the dependencies between this instruction and the previous instruction, instruction 0.

Examples of dependencies include register read-after write dependencies, write-after write dependencies, or functional unit dependencies in the execution units. Other dependencies may exist due to the processors micro-architecture. For example, a special register, wherein the register's updates must be done serially. An example of a functional unit dependency is if both instructions are fixed point instructions, but only one fixed point unit is present in processor core 300. In this instance, instruction 1 receives a start bit to prevent two fixed point instructions being dispatch in the same cycle. These start bit assignments are continued across the remaining instructions, instructions 0–7 in these illustrative examples. The instructions and the associated start bits are then stored in L1 instruction cache 306 by start bit and pre-code logic 304.

Thereafter, fetch unit 308 fetches or reads the instructions out of L1 instruction cache 306. These instructions and their start bits are sent to dispatch unit 310. Dispatch unit then uses the start bits to decide how to form dispatch groups.

In this manner, the mechanism of the present invention allows for correct dispatch group formations to occur. These correct formations occur as long as the instruction flow is sequential in these illustrative examples. Because start bits are generated on sequential instruction flow in these illustrative examples, a taken branch may have a target that does not have a start bit. This situation may cause an invalid dispatch group because of discrepancies in the start bits between the source and target of the branch. This situation is avoided by the illustrative examples through dispatch unit 310 forcing a start bit on an instruction after a taken branch. In this manner, known valid instruction groupings are formed using the grouping mechanism of the present invention.

Figure 4:
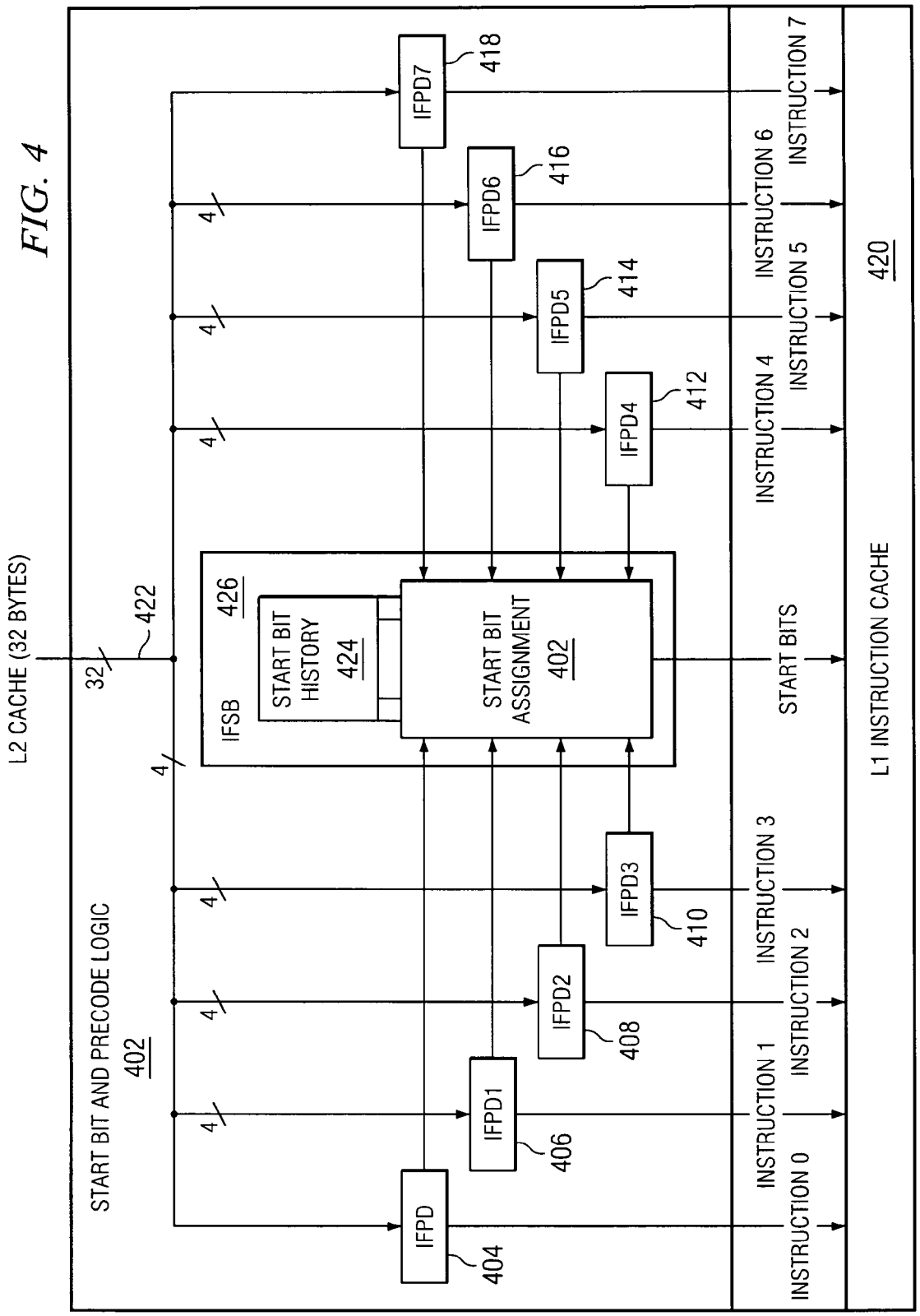
FIG. 4 is a diagram of a start bit and pre-code logic in accordance with an illustrative example of the present invention.

With reference next to FIG. 4, a diagram of a start bit and pre-code logic is depicted in accordance with an illustrative example of the present invention. Start bit and pre-code logic 400 is a more detailed illustration of start bit and pre-code logic 304 in FIG. 3.

This particular logic unit contains start bit assignment 402, pre-code blocks 404, 406, 408, 410, 412, 414, 416, and 418. These pre-code blocks are connected to start bit assignment 402 and L1 instruction cache 420, which is not part of the start and pre-code logic in this example. L1 instruction cache 420 is implemented as L1 instruction cache 306 in FIG. 3. Additionally, these pre-code blocks receive instructions input from bus 422, which is a 32-byte bus connected to a memory or L2 cache. This memory or L2 cache is, for example, memory/L2 cache 302 in FIG. 3 in these illustrative examples.

These pre-code blocks are used to process instructions received from bus 422. These instructions are received from bus 422 as a sector of eight instructions, instruction 0 through instruction 7. Pre-code block 404 receives instruction 0; pre-code block 406 receives instruction 1; pre-code block 408 receives instruction 2; and pre-code block 410 receives instruction 3. Pre-code block 412 receives instruction 4; pre-code block 414 receives instruction 5; pre-code block 416 receives instruction 6; and pre-code block 418 receives instruction 7.

In these illustrative examples, the pre-code blocks are all identical. Each of these blocks takes an instruction opcode as an input and uses combinatorial logic to generate information used by start bit assignment 402 to determine whether to assign a start bit to a particular instruction. Examples of decode information generated by these pre-code blocks include, for example, resource and register valids. The resource identifies the functional unit or units required by the instruction for processing. Register valids identify whether the instruction reads or writes source or target registers. Other decode information also may be generated by these pre-code blocks. This other information may include any information regarding the requirements of the processor architecture.

Start bit assignment 402 uses this decode information to selectively assign start bits to the different instructions. The grouping of instructions may be performed using any currently used mechanism available in processors. The mechanism of the present invention employs start bits to mark these groupings and performs this grouping process prior to this grouping being placed into the instruction cache in these illustrative examples. Start bit history 424 also is connected to start bit assignment 402. Start bit assignment 402 and start bit history 424 are both located within instruction fetch start bit (IFSB) 426 to form the start bit logic of this particular component. The other units form the pre-code portion of this logic unit. Start bit history 424 is used by start bit assignment 422 to maintain a history of start bits between different sectors to minimize the use of unnecessary start bits. When group formations are perform instruction before they are written into the I cache, a problem may occur in which, although instructions are presented to the I cache in a smaller group, a longer history of instructions need to be maintained to allow for maximum grouping instructions. In these examples, this smaller group is a group of eight instructions, instruction0 through instruction7. Instructions requested from bus 422 in FIG. 4 are requested one line at a time. In this example, each line includes 32 instructions per line. These requests are returned in four sectors in which each sector contains eight instructions.

Without a history, a start bit would automatically need to be assigned to the first instruction of every sector. This assignment is necessary to avoid any invalid instruction dispatch groupings across sectors. However, with start bit history 424, the unnecessary start bits may be minimized. This history contains an array that is maintained for outstanding L2 cache requests from the memory or L2 cache.

In these examples, start bit history 424 contains information for the last instructions and sector that are needed for deciding start bit assignments for the first instructions in the following or subsequent sector. Examples of the information stored in start bit history 424 includes, for example, functional unit utilization, registers that are read or written, and any other potential conflict causing cases. A conflict is caused by a dependency between instructions that requires a start bit on the later instruction.

In these illustrative examples, processor core 300 shown in FIG. 3 may have a maximum of three instruction fetch requests outstanding at any given time per thread. For example, these requests may include one demand request and two pre-fetches. In these illustrative examples, three history buffers are maintained in start bit history 424 in which each history buffer corresponds to one of the three requests.

When a first sector of a request is returned, this first instruction is assigned a start bit automatically as described above. Information relating to the last four instructions in that sector are stored in a history buffer within start bit history 424. When the second sector of the request is returned, it is determined if the two sectors have returned sequentially, such as sector 0 followed by sector1. If the sectors are sequential, the history from the first sector is used to determine start bits from the second sector. Instruction 0, the second sector does not automatically receive a start bit in this particular illustrative example because of the information maintained within start bit history 424. If the sectors are not sequential, then instruction 0 of the second sector automatically receives a start bit.

In both cases, the second sectors information replaces the information from the first sector. Mainly, only one sector history per request is performed in these illustrative examples to minimize resource use. Of course, additional history may be saved from more than one sector depending on the particular implementation.

With this type of design, it is advantageous to have sectors return from the L2 cache as close to in order as possible. A sector return sequence of zero, one, two, three allows for optimal group formations. On the other hand, an out of order such as return of one, three, zero, two is a worst case and forces a start bit on instruction 0 of every sector.

Figure 5:
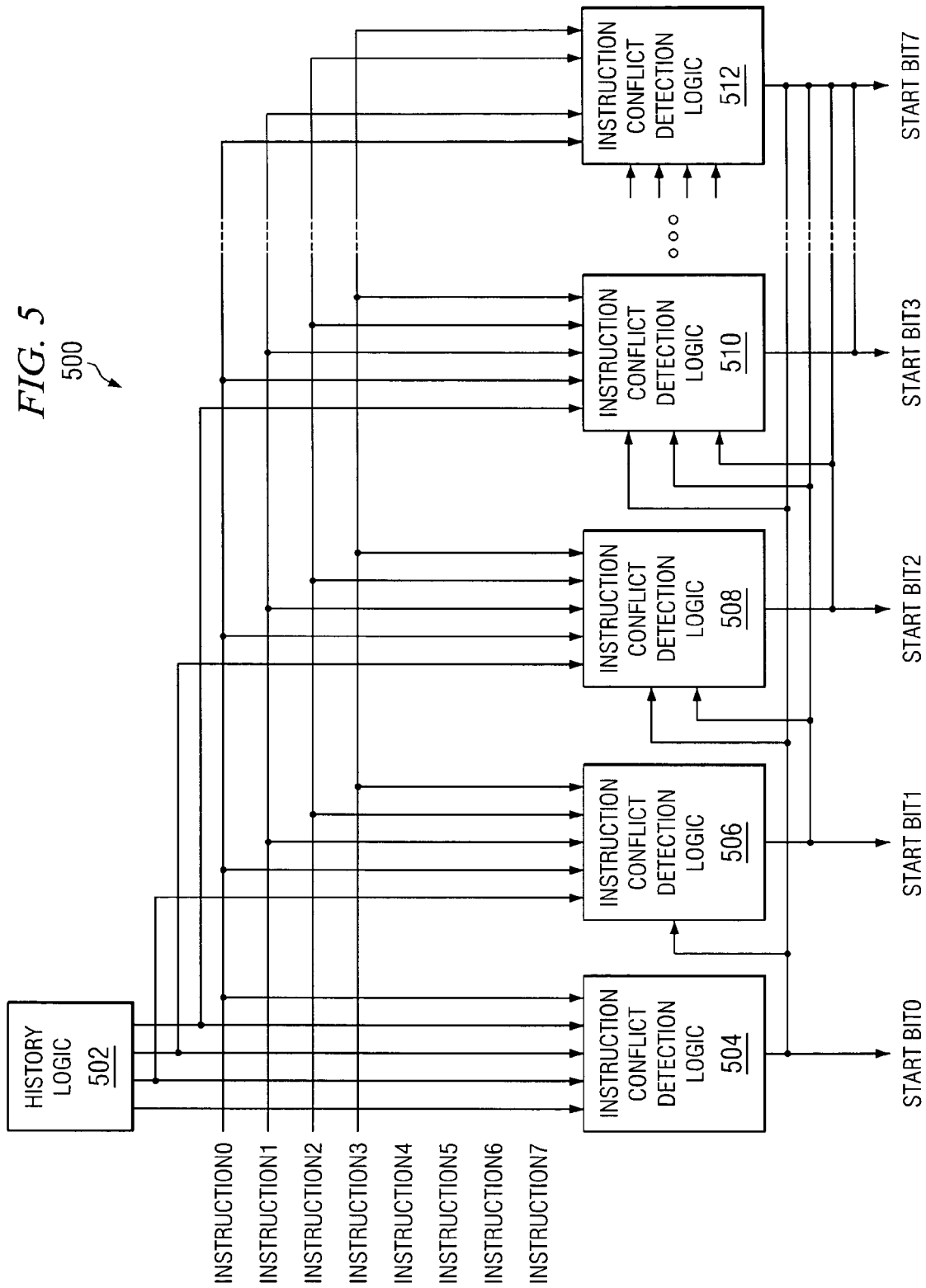
FIG. 5 is a diagram illustrating start bit logic flow in accordance with an illustrative example of the present invention.

Turning next to FIG. 5, a diagram illustrating start bit logic flow is depicted in accordance with an illustrative example of the present invention. In this example, these components are examples of components that may be implemented within a start bit logic unit, such as start bit assignment 402 in FIG. 4. Start bit logic 500 contains history logic 502, instruction conflict detection logic units 504, 506, 508, 510, and 512.

For purposes of illustration, only instruction conflict detection logic units are shown for instructions zero, one, two, three, and seven. Similar connections are present for instruction conflict detection logic units for instructions four through six. These other units are not shown in this example to simplify the illustration of the data flow.

History logic 502 is used to retrieve information from a start bit history, such as start bit history 424 in FIG. 4. The information for each of these instructions are sent to the different instruction conflict detection logic units to determine whether a start bit is to be generated for each of the instructions in a sector. In this illustrative example, a sector contains eight instructions. Each instruction conflict detection logic unit selectively generates a start bit depending on the information received by the logic unit. These start bits are the ones that are associated with the instructions for group formation. In this example, four instructions are maintained in the history because the maximum dispatch group size is five. As a result, any additional history is not needed. As the dispatch group size changes, the number of instructions maintained in the history also change.

Figure 6:
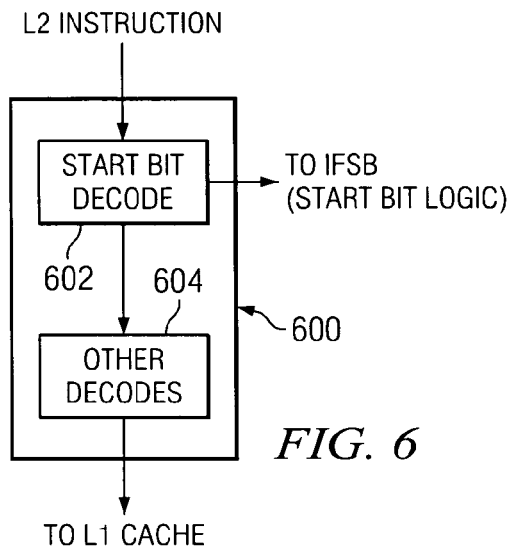
FIG. 6 is a diagram illustrating pre-code logic dataflow in accordance with an illustrative embodiment of the present invention.

Turning next to FIG. 6, a diagram illustrating pre-code logic dataflow is depicted in accordance with an illustrative embodiment of the present invention. In this example, pre-code unit 600 receives an L2 instruction, such as that from an L2 cache or memory. A start bit decode is performed in (step 602). This information is sent to a start bit logic, such as start bit logic 500 in FIG. 5. To determine whether a start bit should be generated for this particular instruction. The start bit information decoded includes, for example, the resources needed to process the particular instruction code. For example, the instruction may require a general purpose register or a floating point register. Other information as described above is also decoded in this block. Thereafter, other decodes are performed (step 604) with the instruction then being passed to the L1 instruction cache. Other decodes include, for example, decodes to aid in branch prediction, and decodes to aid in dispatching units, i.e. instructions that require a dispatch pause after their group.

Figure 7:
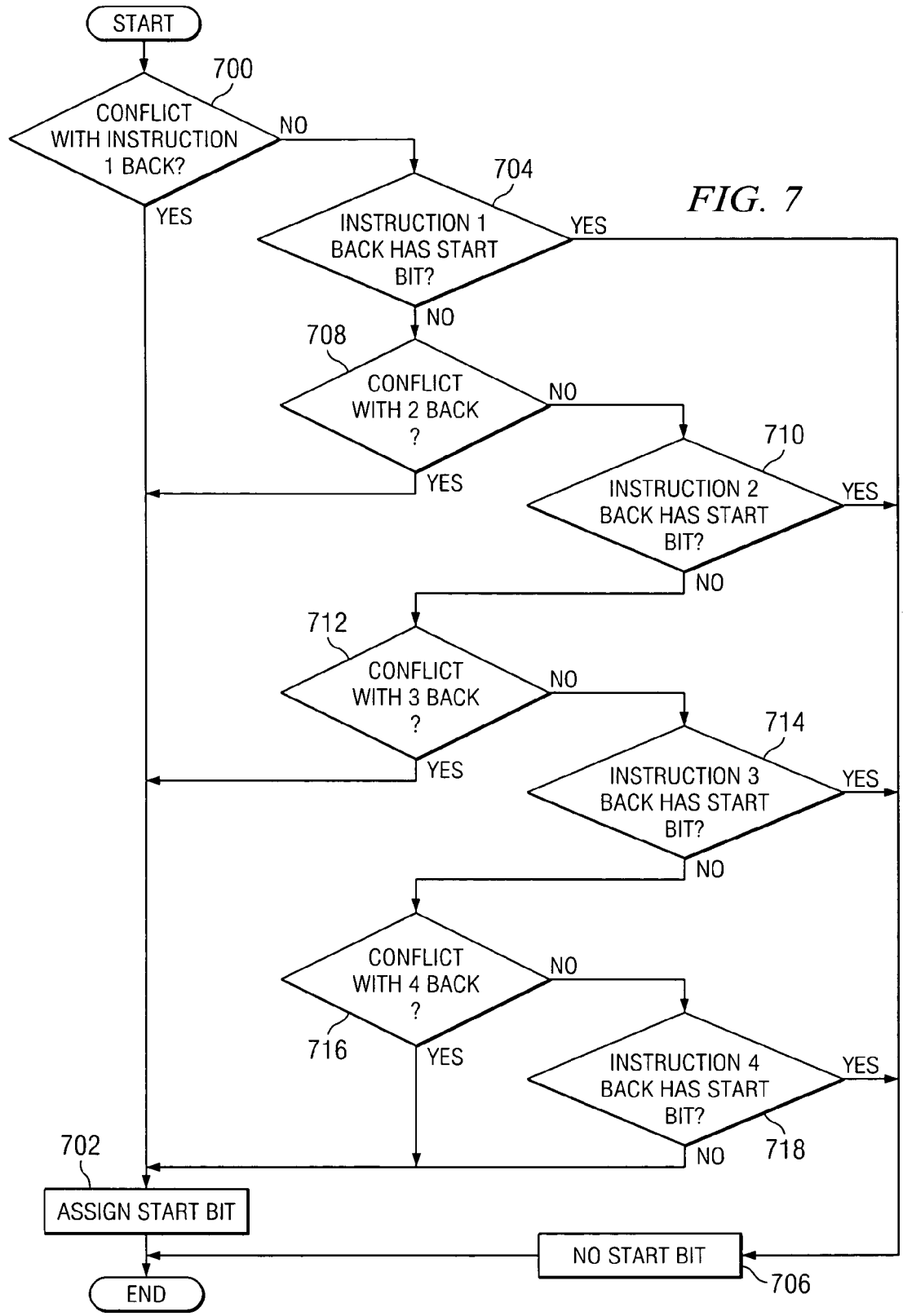
FIG. 7 is a flowchart illustrating a process for assigning start bits in accordance with an illustrative embodiment of the present invention.

Turning next to FIG. 7, a flowchart illustrating a process for assigning start bits is depicted in accordance with an illustrative embodiment of the present invention. The process begins by determining whether a conflict is present with instruction one back (step 700). An instruction1 back is a previous instruction to the current one being examined. If a conflict is present, a start bit is assigned to the instruction (step 702) with the process terminating thereafter. With reference again to step 700, if a conflict is not present, a determination is made as to whether instruction1 back has a start bit (step 704). If instruction1 back has a start bit, no start bit is assigned to the current instruction (step 706) with the process terminating thereafter because instructions further back will already be in a different dispatch group.

With reference again to step 704, if instruction1 back does not have a start bit, a determination is made as to whether a conflict is present with instruction2 back (step 708). An instruction two back is the instruction that is two prior to the current instruction being examined. If a conflict is present, the process proceeds to step 702, as described above. Otherwise, a determination is made as to whether instruction2 back has a start bit (step 710). If a start bit is present, the process proceeds to step 706, as described above. Otherwise, the process proceeds to determine whether a conflict is present with instruction 3 back (step 712). If a conflict is present, the process proceeds to step 702.

If a conflict is not present, the process determines whether instruction 3 back has a start bit (step 714). If a start bit is present in instruction 3 back, the process proceeds to step 706. If a start bit is absent, a determination is made as to whether a conflict is present with instruction4 back (step 716). If a conflict is present, the process proceeds to step 702 as described above to assign start bit. Otherwise, a determination is made as to whether instruction4 back has a start back (step 718). If a start bit is present, no start bit is detected. Otherwise, a start bit is assigned as described in step 702.

Figure 8:
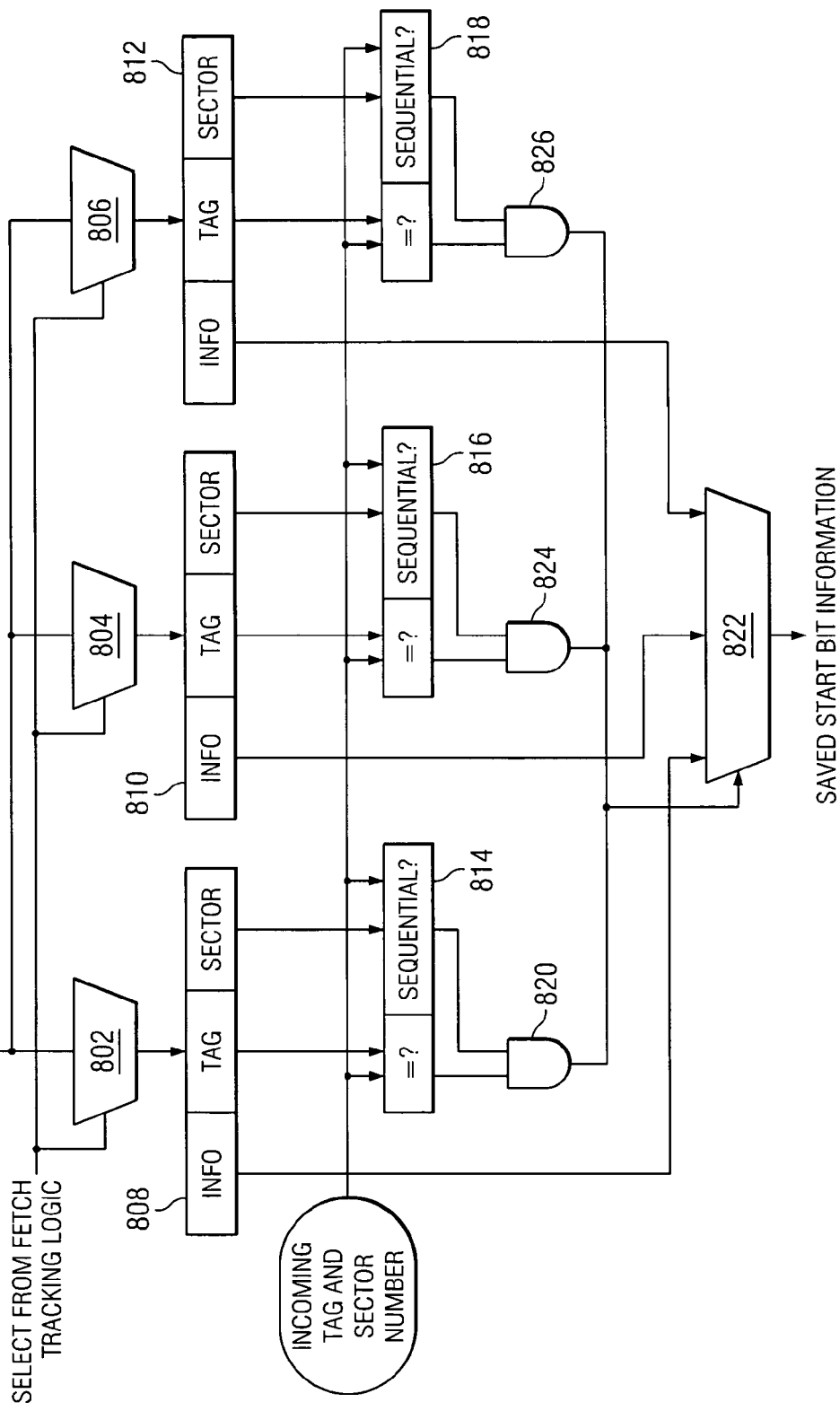
FIG. 8 is a diagram illustrating logic for a start bit history unit in accordance with an illustrative embodiment of the present invention.

Turning next to FIG. 8, a diagram illustrating logic for a start bit history unit is depicted in accordance with an illustrative embodiment of the present invention. This logic is located in start bit history 424 in FIG. 4. The saved start bit history information is the information used by start bit assignment 402 in FIG. 4.

In this example, start bit history unit 800 contains multiplexers 802, 804, and 806. Each of these multiplexers select data to be received from a start bit history based on a select signal from fetch tracking logic. This start bit history is, for example, start bit history 424 in FIG. 4. The information from the last four instructions of the sector being written into the cache is selected by these multiplexers.

This information is selectively placed into registers 808, 810, and 812. Each of these registers contains information, a tag identifier, and a sector number. A tag is assigned on a per-line basis when the L2 request is made. The tag identifier is used to track requests. The sector number identifies which sector within the line is returning. The tag identifier is used to differentiate between multiple requests that can be outstanding at the same time. The tags are ones generated when a request is sent to retrieve data from memory or an L2 cache. When a result is returned, the tag of the request is included in the response. The sector number tells which sector out of the four sectors contains the instructions in these illustrative examples. Three registers are used in this example because three fetches are tracked, one demand and two prefetches. Of course, other numbers of register may be used depending on the number of fetches that are to be tracked.

Comparison logic 814, 816, and 818 are used to identify start bit information for a particular instruction within a sector. Inputs into this logic include the incoming tag and sector number as well as the tag and sector numbers from registers 808, 810, and 812. A comparison is made by the logic in registers 814, 816, and 818 to determine what information to send to the start bit assignment logic, such as start bit assignment 402 in FIG. 4 to determine whether a start bit should be assigned to the instruction currently being processed. If the tags match, an output of one is generated from the comparison logic. Additionally, an output of one is also generated if the sector number from the register is sequential with respect to the incoming sector number. A sector is sequential to a previous sector if the sector numbers for those two sectors are sequential. For example, is the sector register number is 04, and the incoming sector number is 1, these two numbers are sequential. If both outputs are one, then the AND gate, associated with the comparison logic, selects the information regarding the instruction from one of the registers.

Comparison logic 814 is connected to AND gate 820 with the output being connected to the selection input of multiplexer 822. AND gate 824 is connected to the outputs of 816 with the output of this AND gate being connected to the input of multiplexer 822. AND gate 826 has its inputs connected to 818 with its output being connected to the selection input of multiplexer 822. The information portion of registers 808, 810, and 812 are connected to the inputs of multiplexer 822. Depending upon the particular selection input made the information from one of these registers is output as saved start bit information. This saved start bit information includes, for example, the execution unit needed to execute the instruction, the status of the instruction, and the register that may be used by the instruction, as well as whether a start bit is associated with the previous instruction.

For example, when an incoming tag and sector number is received, 814 compares the tag information from register 808 with the incoming tag and the sector number information from register 808 with the incoming sector number. If the output for both of these comparisons are equal to one, a one is output by AND gate 820 selecting the information from register 808 to be output through multiplexer 822. A similar process is performed by each of the other comparison units. If no match occurs, no history is used and instruction 0 of the incoming sector gets a start bit automatically.

In this manner, history information from prior sectors may be used in creating groupings of instructions that may have sizes larger than the sectors and in which these grouping may span across multiple sectors.

Thus, the present invention provides an improved method, apparatus, and computer instructions for grouping instructions for execution within a processor core. The grouping of instructions is performed prior to the instructions being placed into an instruction cache to minimize bottlenecks present with currently available processor architectures. Additionally, a start history is used to retain information from prior sectors to avoid having to unnecessarily assign start bits. Of course, the sector sizes and number of instructions may vary depending upon the particular processor architecture implemented.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for grouping instructions that are to be dispatched as a group for concurrent execution by a plurality of execution units within a processor the method comprising:
   receiving a current set of instructions;
   determining whether any instructions in the current set of instructions can be grouped with a prior group formed from a prior set of received instructions by using a history data structure, wherein the history data structure contains data regarding prior instructions in the prior set of received instructions and the data is used to determine if any instruction conflict would occur between an instruction in the current set of instructions and a prior instruction in the prior group;
   responsive to a determination that the any instructions can be grouped with the prior group, grouping the any instructions into the prior group; and
   dispatching all instructions in the prior group to the plurality of execution units for concurrent execution of the all instructions.

2. The method of claim 1, wherein the history data structure is a history buffer.

3. The method of claim 1, wherein the current set of instructions is a first sector and the prior set of received instructions is a second sector, and both the first sector and the second sector are part of a cache line that is provided in response to an instruction request by the processor.

4. The method of claim 1, wherein the history data structure identifies any start bits in the prior set of received instructions, wherein a start bit indicates a beginning of a grouping of instructions.

5. The method of claim 1, wherein the history data structure is located in a cache in the processor.

6. The method of claim 1, wherein the determining step and the grouping step are executed using a start bit assignment unit within the processor.

7. The method of claim 6, wherein the dispatching step is performed using a dispatch unit within the processor.

8. The method of claim 1, wherein the prior set of received instructions are sequential with the current set of instructions.

9. The method of claim 1, wherein the receiving step, determining step, grouping step, and dispatching step are performed by the processor.

10. A system, comprising:
    a memory;
    a processor core, wherein the processor core comprises an instruction cache, a fetch unit coupled to the instruction cache, a dispatch unit coupled to the fetch unit, a plurality of execution units coupled to the dispatch unit, and an instruction grouping unit coupled between the memory and the instruction cache, wherein the instruction grouping unit groups certain instructions received from the memory into a preexisting group of preexisting instructions stored in the instruction cache if the certain instructions can be concurrently executed by at least some of the plurality of execution units without resource conflict with the preexisting instructions, by using history information for at least some of the preexisting instructions that specifies certain resources required by the at least some of the preexisting instructions when executed by the processor core.

11. The system of claim 10, wherein the instructions received from the memory are organized as a second sector of a cache line provided to the processor core in response to an instruction request by the processor core, and wherein the preexisting instructions were previously received from the memory as a first sector of the cache line provided to the processor core in response to the instruction request by the processor core such that at least one of the instructions of the second sector is conditionally grouped with the preexisting group of preexisting instruction such that instructions spanning cache line sectors are conditionally grouped together.

12. The system of claim 11, wherein none of the instructions of the second sector is grouped with the preexisting group of preexisting instructions if the first sector and second sector are not sequential with respect to one another.

13. The system of claim 11, wherein the instruction information further comprises sector identifiers for identifying what sector each of the at least some of the preexisting instructions is associated with.

14. The system of claim 13, wherein the instruction information further comprises cache line identifiers for identifying what cache line each of the at least some of the preexisting instructions is associated with.

* * * * *